Jan. 4, 1966  L. SCHAFER  3,227,103
SPIRAL DESIGN PASTRY DIE
Filed Aug. 21, 1963

United States Patent Office 3,227,103
Patented Jan. 4, 1966

3,227,103
SPIRAL DESIGN PASTRY DIE
Leonhard Schafer, 219 Miriam St., Bronx, N.Y.
Filed Aug. 21, 1963, Ser. No. 303,488
2 Claims. (Cl. 107—1)

This invention relates to an article of manufacture, an extrusion die used to extrude pastry dough to form an extruded rod having a spiral design therein.

In the manufacture of butter cookies, it is desirable to provide said cookies with various integral designs therein.

To obtain these designs by means of hand operations is very costly and in some cases impossible to accomplish because of the intricacy of the design.

It is an object of this invention to provide a die for the extrusion of pastry dough wherein the extruded rod is provided with a spiral portion of different color and/or taste.

It is another object to provide a two piece die capable of being readily cleaned.

Figure 1:
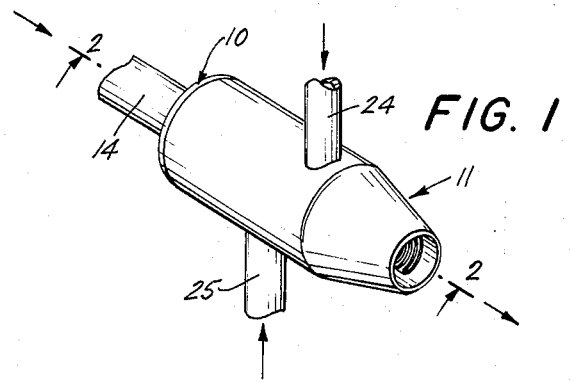
Figure 2:
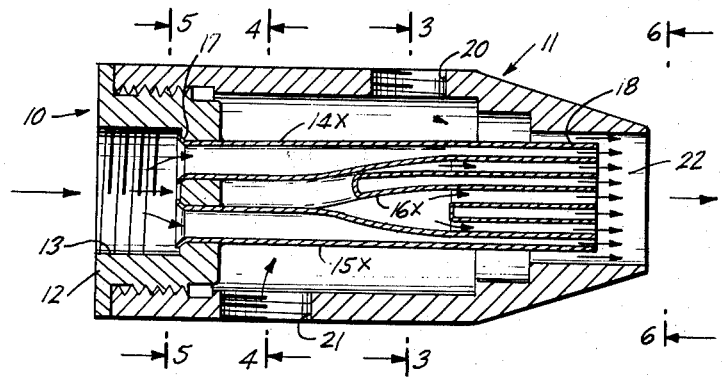
Figure 5:
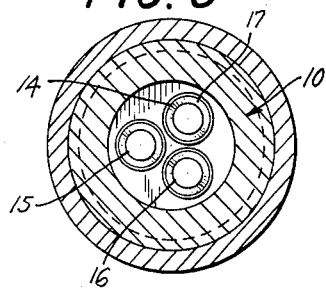
Figure 4:
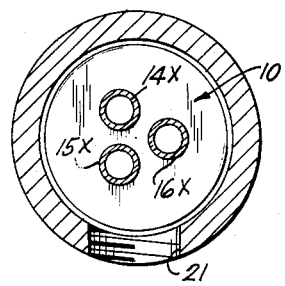
Figure 3:
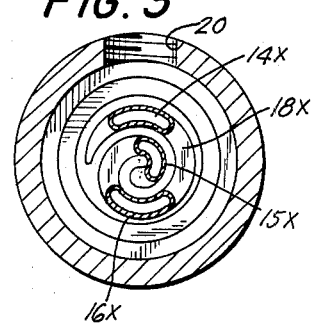
Figure 6:
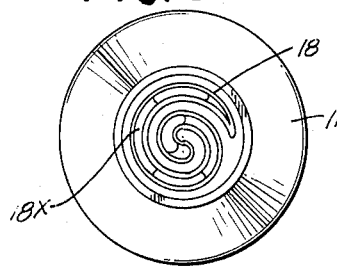
Figure 7:
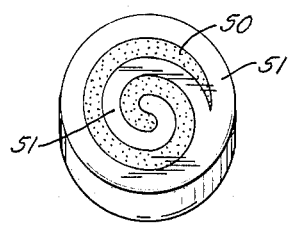

These and other objects of this invention will become readily apparent upon reading the following descriptive disclosure of an illustrative embodiment thereof taken in conjunction with the accompanying drawing in which;

FIG. 1 is a perspective view of the assembled die showing by means of arrows the flow of pastry dough into and out of the die, FIG. 2 is a longitudinal section view taken on line 2—2 of FIG. 1 and showing by means of arrows the flow streams of the pastry dough therein, FIG. 3 is a transverse section view taken on line 3—3 of FIG. 2, FIG. 4 is a transverse section view taken on line 4—4 of FIG. 2, FIG. 5 is another transverse section view taken on line 5—5 of FIG. 2, FIG. 6 is a front view of the die taken on line 6—6 of FIG. 2, and FIG. 7 is a perspective view of a cookie subsequently severed from the rod formed by the die.

According to this invention, the two streams of pastry dough are of suitable high consistency and are forced by means of high pressure into the die, being commingled and bonded within the die in a pattern relationship to form a well bonded extruded rod of substantially continuous length.

The rod is cut from the die at a suitable length for storage in a refrigerated compartment and is cut transversely in cookie size and baked as needed to produce freshly baked cookies.

Turning to the drawing, the die consists of two pieces namely an inner tubular element 10 and an outer or jacket element 11, screw threaded at its base to said inner element 10.

As shown in FIGS. 2-6, the inner element 10 is provided with an exteriorly threaded cylindrical base 12 having a threaded cavity 13 therein to receive a pipe 14 (FIG. 1). The base 10 is suitably provided with three apertures 14, 15 and 16 communicating with said cavity 13 (FIG. 5).

Three tubular conduits 14X, 15X and 16X are secured by press fitting and flange ends 17 into the respective apertures 14, 15 and 16.

The conduits 14X, 15X and 16X terminates in sections of elongated cross-section suitably secured in the base 18X of a spiral tube 18.

The pastry fed from conduit 14 is forced through conduits 14X, 15X and 16X into the bottom wall 18X of the spiral tube 18 at three suitable apertures in the container bottom wall 18X (FIG. 3) so that the three streams commingle intimately into one another as they pass through the spiral container, issuing as a single stream of spiral design from the container 18.

The outer or jacket tubular element 11 is of cylindrical bullet shaped configuration being provided with suitably disposed and opposed inlet apertures 20 and 21 for introducing the second pastry stream into the die.

The jacket 11 is provided with interior screw threads at its base to engage the threads of base 12 of the element 10 thereby rigidly uniting the jacket 11 to the inner element 10 in spaced-apart relationship above this area of securing one to the other.

The jacket 11 is provided with a horizontal cylindrical outlet aperture 22 (FIG. 2). The spiral tube 18 has horizontal walls which are disposed in spaced-apart parallel relationship in the cylindrical aperture wall 22 of jacket 11 to about one-half of length of said wall 22.

Thus a horizontal stream of spiral dough is made to engage a second coacting parallel horizontal stream of pastry dough being forced between the convolutions of the spiral tube 18. This second stream of dough is introduced into the space and between the inner element tubes 14X, 15X and 16X by means of pipe 24 secured to aperture 20 and pipe 25 secured to aperture 21. Thus the second stream of pastry dough is forced around the tubes and then past the spiral walls, which walls are parallel to the cylindrical wall 22.

In short, a first stream of pressurized pastry dough 50 enters pipe 14 and thence tubes 14X, 15X and 16X and thence into the base 18X of the spiral shaped tube 18 at three suitable spaced-apart apertures in the base 18X thereof.

The dough 50 is extruded in spiral form (FIG. 7) suitably deep within the horizontal cylindrical portion 22 of the jacket.

Moreover, this first stream of dough 50 is issuing in a horizontal manner and hence in parallel relationship to the wall 22.

The second stream of pastry dough 51 is introduced under suitable high pressure through conduits or pipes 24 and 25 and fills the empty space within jacket 11 and then it is forced around the spiral container walls so that the second stream is provided with a horizontal flow (FIG. 2) when it meets and commingles with the first stream which also is provided with a parallel horizontal flow as described above.

The movement of both streams in commingled relationship within the latter half of the cylindrical portion 22 of jacket 11 effects a bonding of both streams so as to prevent fracture along the lines of juncture of said streams.

I claim:

1. An extrusion die for commingling a pair of pastry dough streams into a rod having a preselected spiral design therein comprising an inner tubular element for receiving the inner core stream having an exteriorly threaded base portion having a cavity therein communicating with a plurality of apertures, a plurality of conduits each secured at one end to said base apertures, and a spiral tube having relatively long side walls and a bottom wall, said bottom wall having a plurality of apertures therein each respectively secured to the other end of said conduits; and a jacket tubular element threaded interiorly at its base to engage said base of said first element and having at least one inlet aperture for receiving a second pastry dough stream, said jacket element having a cylindrical wall front portion disposed in suitable spaced-apart relationship to said long spiral tube with the end of said spiral tube being disposed a suitable distance within said cylindrical wall portion of said jacket, whereby said two streams are commingled within said jacket in a parallel moving relationship.

2. The die of claim 1 wherein the number of conduits is three, said conduits being secured to the bottom wall of the spiral tube in a suitable spaced-apart manner.

References Cited by the Examiner

UNITED STATES PATENTS 3,196,810   7/1965   Roth ---------------- 107—1

FOREIGN PATENTS 897,529   5/1962   Great Britain.

WALTER A. SCHEEL, Primary Examiner.

JOSEPH SHEA, Examiner.